(12) United States Patent
Na

(10) Patent No.: US 8,281,813 B2
(45) Date of Patent: Oct. 9, 2012

(54) COOLANT TEMPERATURE CONTROLLER FOR FUEL CELL VEHICLE

(75) Inventor: Sung Wook Na, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 1136 days.

(21) Appl. No.: 12/215,806

(22) Filed: Jun. 30, 2008

(65) Prior Publication Data

US 2009/0142635 A1     Jun. 4, 2009

(30) Foreign Application Priority Data

Dec. 4, 2007   (KR) .................. 10-2007-0124729

(51) Int. Cl.
*F16K 11/07* (2006.01)

(52) U.S. Cl. .................. 137/625.48; 137/625.4

(58) Field of Classification Search .......... 137/605, 137/607, 625.48, 896, 897, 898; 251/129.11, 251/129.12, 129.13; 222/145.1, 145.7
See application file for complete search history.

(56) References Cited

U.S. PATENT DOCUMENTS

| | | | | |
|---|---|---|---|---|
| 4,546,338 A | * | 10/1985 | Idogaki et al. | 335/229 |
| 4,726,325 A | * | 2/1988 | Itakura | 123/41.1 |
| 5,189,991 A | * | 3/1993 | Humburg | 123/41.1 |
| 5,727,729 A | * | 3/1998 | Hutchins | 236/34.5 |
| 6,688,262 B2 | * | 2/2004 | Murakami et al. | 123/41.1 |
| 6,915,958 B2 | * | 7/2005 | Colas et al. | 236/34.5 |
| 2007/0204984 A1 | * | 9/2007 | Limbeck | 165/202 |

FOREIGN PATENT DOCUMENTS

| | | |
|---|---|---|
| JP | 01150077 | 6/1989 |
| JP | 06-050444 | 2/1994 |
| JP | 06-323137 A | 11/1994 |
| JP | 11-102226 | 4/1999 |
| JP | 2004-158355 | 6/2004 |
| JP | 2004-178826 | 6/2004 |

* cited by examiner

*Primary Examiner* — Eric Keasel
*Assistant Examiner* — Reinaldo Sanchez-Medina
(74) *Attorney, Agent, or Firm* — Edwards Wildman Palmer LLP; Peter F. Corless

(57) ABSTRACT

A coolant temperature controller for a fuel cell vehicle comprises: a housing including first and second inlet ports provided on one side thereof and an exhaust port provided on the other side thereof in a horizontal direction with respect to the first inlet port; a plunger operating portion including an operating plunger for capable of vertical movement between the first and second inlet ports and the exhaust port of the housing to proportionally control degree of opening of the first and second inlet ports; a motor mounted on the top of the plunger operating portion; and a motor shaft connected to the motor and extending from the motor to the bottom of the plunger operating portion to be connected to the operating plunger, wherein the vertical movement of the operating plunger is driven by a rotational force transmitted through the motor shaft as the motor operates. The controller can maintain the coolant at a preset temperature for optimal operation of the fuel cell stack.

5 Claims, 6 Drawing Sheets

COOLANT TEMPERATURE CONTROLLER FOR FUEL CELL VEHICLE

CROSS-REFERENCE TO RELATED APPLICATION

This application claims under 35 U.S.C. §119(a) the benefit of Korean Patent Application No. 10-2007-0124729 filed Dec. 4, 2007, the entire contents of which are incorporated herein by reference.

BACKGROUND (a) Technical Field

The present invention relates to a coolant temperature controller for a fuel cell vehicle. More particularly, the present invention relates to a coolant temperature controller for a fuel cell vehicle, in which a temperature control valve is provided at an inlet end of a fuel cell stack and the temperature control valve is proportionally controlled so that heated coolant coming from a by-pass and/or cooled coolant from a radiator is/are introduced into the stack according to a coolant temperature of the stack inlet, thus being able to provide coolant at a temperature required for optimum operation of the stack.

(b) Background Art

A fuel cell system is an electricity generation system that converts chemical energy of fuel directly into electric energy.

The fuel cell system generally comprises a fuel cell stack for generating electricity, a fuel supply system for supplying fuel (hydrogen) to the fuel cell stack, an air supply system for supplying oxygen in air, which is an oxidizing agent required for an electrochemical reaction, to the fuel cell stack, and a thermal and water management system for removing reaction heat of the fuel cell stack to the outside of the fuel cell system and controlling the operation temperature of the fuel cell stack.

The fuel cell system having the above configuration generates electricity by the electrochemical reaction of hydrogen as fuel and oxygen in air and exhausts heat and water as reaction by-products.

The fuel cell stack, which generates electricity by receiving oxygen in air and hydrogen as fuel, is used as a main power supply source of a fuel cell vehicle.

Since the fuel cell stack shows an optimal output stably when the coolant controlled at an optimal temperature is supplied to the stack, it is important to maintain the coolant introduced into the stack at a specific temperature.

Accordingly, the fuel cell vehicle includes a coolant temperature controller mounted in a fuel cell stack cooling loop to control the temperature of the coolant introduced into the stack.

FIG. 1 is a diagram showing a fuel cell stack cooling loop in a fuel cell vehicle. Upon initial start-up of a fuel cell system, when the coolant temperature is low due to a low heat generation rate of a stack 10, the coolant flows in the following order: stack 10→pump 11→temperature control valve 13→stack 10. That is, it is not necessary to send the coolant to a radiator 12 due to the low coolant temperature.

However, the heat generation rate of the stack 10 is increased with the passage of time, and thus if the temperature of the coolant flowing through the by-pass loop is rapidly increased, the temperature control valve 13 appropriately cuts off the by-pass loop and opens a radiator loop so that the coolant cooled in the radiator 12 is introduced into the stack 10 (in the following order: 10→11→12→13→10).

In view of that the coolant temperature required in the stack inlet applied to the fuel cell vehicle is about 65° C., the temperature control valve receives a signal of an inlet temperature T1 of the stack 10 to appropriately control the degree of opening of both loops so that coolant at a predetermined temperature is supplied to the stack regardless of external environment.

FIG. 2 is a diagram showing a conventional rotary type temperature control valve 130, in which a control method using a flow controller 134 by a motor mounted on the top of the valve 130 is employed.

The temperature control valve 130 comprises a first inlet port 131 through which coolant coming from a by-pass line (stack outlet) is introduced, a second inlet port 132 through which coolant from a radiator is introduced, and an exhaust port 133 through which coolant is exhausted to a stack inlet. Moreover, the flow controller 134 is provided in the valve 130 so that the coolant may be introduced through the first and second inlet ports 131 and 132 at the same time.

The above control method is a method in which the flow controller 134 provided therein is rotated left and right by the motor to control the temperature of the coolant flowing in the stack 10 by adjusting the mixing ratio of the cooled coolant coming from the radiator and the coolant from the by-pass line. With the proportional control of the flow controller 134, the control method can supply a constant amount of coolant to the stack 10.

However, the above temperature control valve 130 has a drawback in that, in the case where the rotation of the flow controller 134 by the motor is controlled under high flow conditions of more than 200 LPM, motor torque is excessively increased due to pressure generated by the coolant flow, and an accurate control thus becomes impossible. Moreover, since the rotary type temperature control valve is of high price, it is not suitable for the vehicle.

Meanwhile, FIG. 3 is a diagram showing a conventional direct-acting temperature control valve 230. The direct-acting temperature control valve 230 is operated by a motor 234 in the same manner as the rotary type valve 130. It comprises a housing including a first inlet port 231 through which coolant coming from a by-pass line is introduced, a second inlet port 232 through which coolant from a radiator is introduced, an exhaust port 233 through which coolant is exhausted to a stack inlet, and a diaphragm provided therein and selectively opening and closing the first and second inlet ports 231 and 232.

The control method associated with the direct-acting valve 230 controls a motor 234 according to the coolant temperature of the system in the same manner as that associated with the rotary type valve 130; however, there is a difference in that it alternately passes the heated coolant coming from the stack outlet and the cooled coolant from the radiator to control the coolant temperature of the system.

In this case, the diaphragm provided inside the valve housing makes the coolant coming from the stack outlet and the coolant from the radiator flow selectively by the drive of the motor.

The above direct-acting temperature control valve 230 shows a better motor control performance even under high flow conditions compared with the rotary type valve 130; however, it has a drawback in that, since it is impossible to proportionally control the cooled coolant coming from the radiator and the heated coolant from the stack, it is difficult to precisely control the coolant temperature for the stabilization of the stack output.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. The present invention is directed to a coolant temperature controller for a fuel cell vehicle, in which a temperature control valve having both an advantage of a rotary type valve to be able to proportionally control the flow of coolant and an advantage of a direct-acting type valve to be able to control a motor smoothly even under high flow conditions is provided at an inlet end of a stack, and the temperature control valve is proportionally controlled so that heated coolant coming from a by-pass and/or cooled coolant from a radiator are/is introduced into the stack according to a coolant temperature of the stack inlet.

In one aspect, the present invention provides a coolant temperature controller for a fuel cell vehicle, the coolant temperature controller comprising: a housing including first and second inlet ports provided on one side thereof and an exhaust port provided on the other side thereof in a horizontal direction with respect to the first inlet port; a plunger operating portion including an operating plunger for capable of vertical movement between the first and second inlet ports and the exhaust port of the housing to proportionally control degree of opening of the first and second inlet ports; a motor mounted on the top of the plunger operating portion; and a motor shaft connected to the motor and extending from the motor to the bottom of the plunger operating portion to be connected to the operating plunger, wherein the vertical movement of the operating plunger is driven by a rotational force transmitted through the motor shaft as the motor operates.

Preferably, the second inlet port may be positioned so as to be inclined with respect to the first inlet port in the plunger operating portion.

Also preferably, the first and second inlet ports may be positioned in the plunger operating portion such that coolant introduced from a radiator through the first inlet port and coolant introduced from a stack outlet through the second inlet port meet.

Suitably, the operating plunger may be vertically provided inside the plunger operating portion and the motor shaft penetrates the center of the operating plunger to be screw-connected thereto.

Also suitably, the operating plunger may be formed in an oval shape.

According to preferred embodiments of the present invention, at lease one of the coolant introduced through the first inlet port and coolant introduced through the second inlet can be supplied to a stack inlet through the exhaust port by the vertical movement of the operating plunger.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
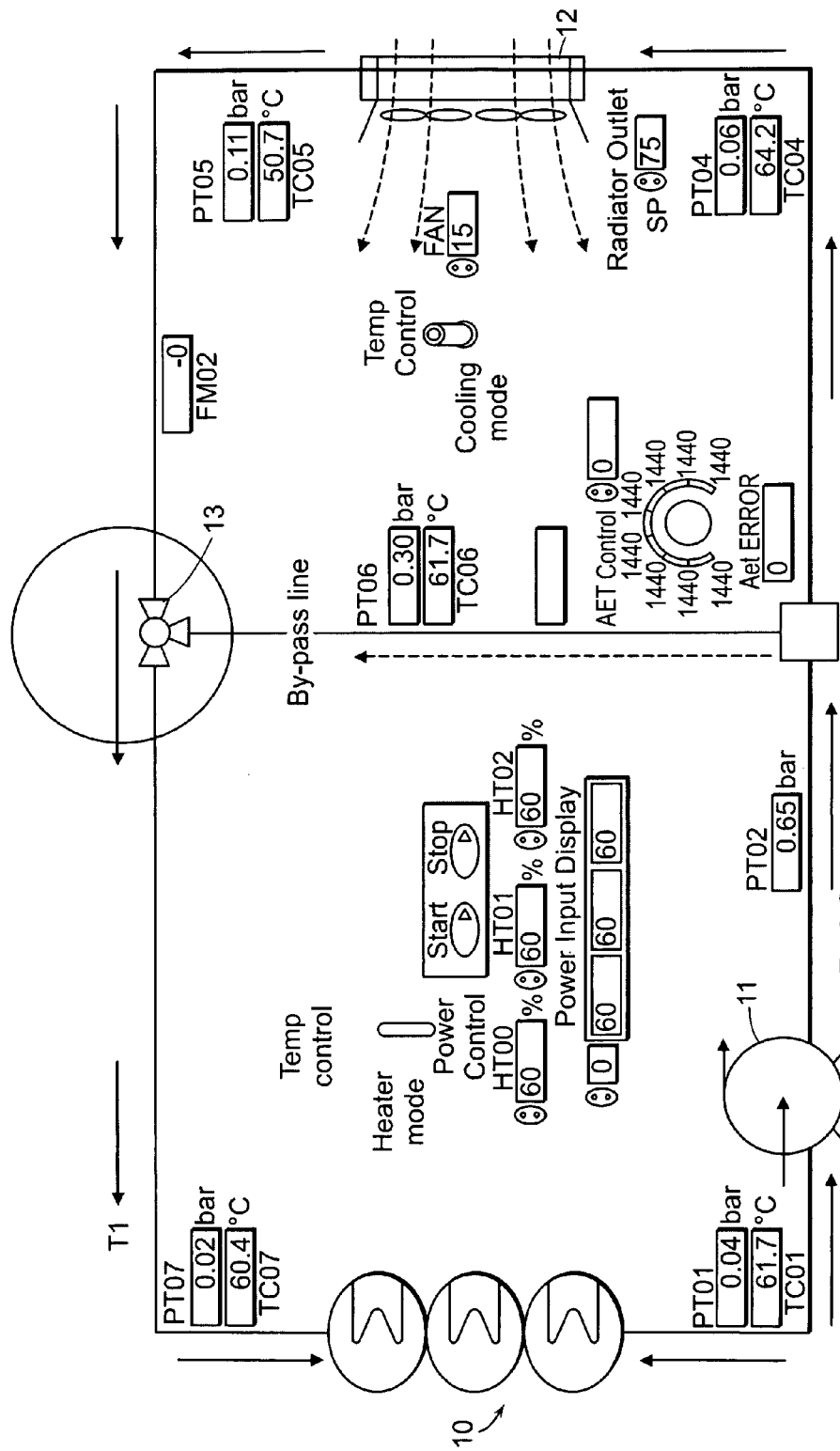
FIG. 1 is a diagram showing a fuel cell stack cooling loop in a fuel cell vehicle.
Figure 2:
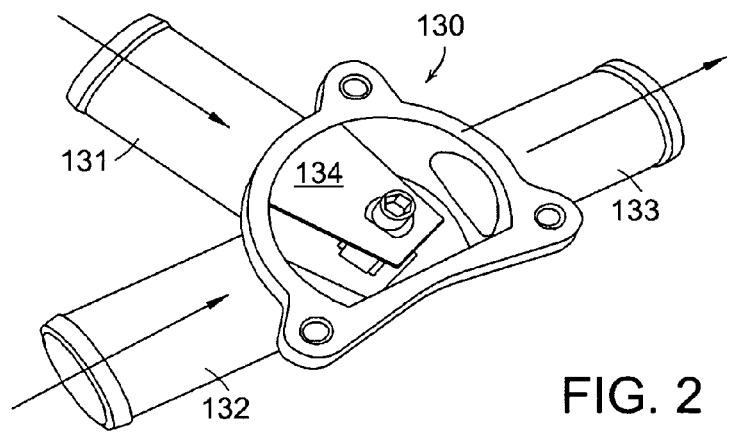
FIG. 2 is a diagram showing a conventional rotary type temperature control valve.
Figure 3:
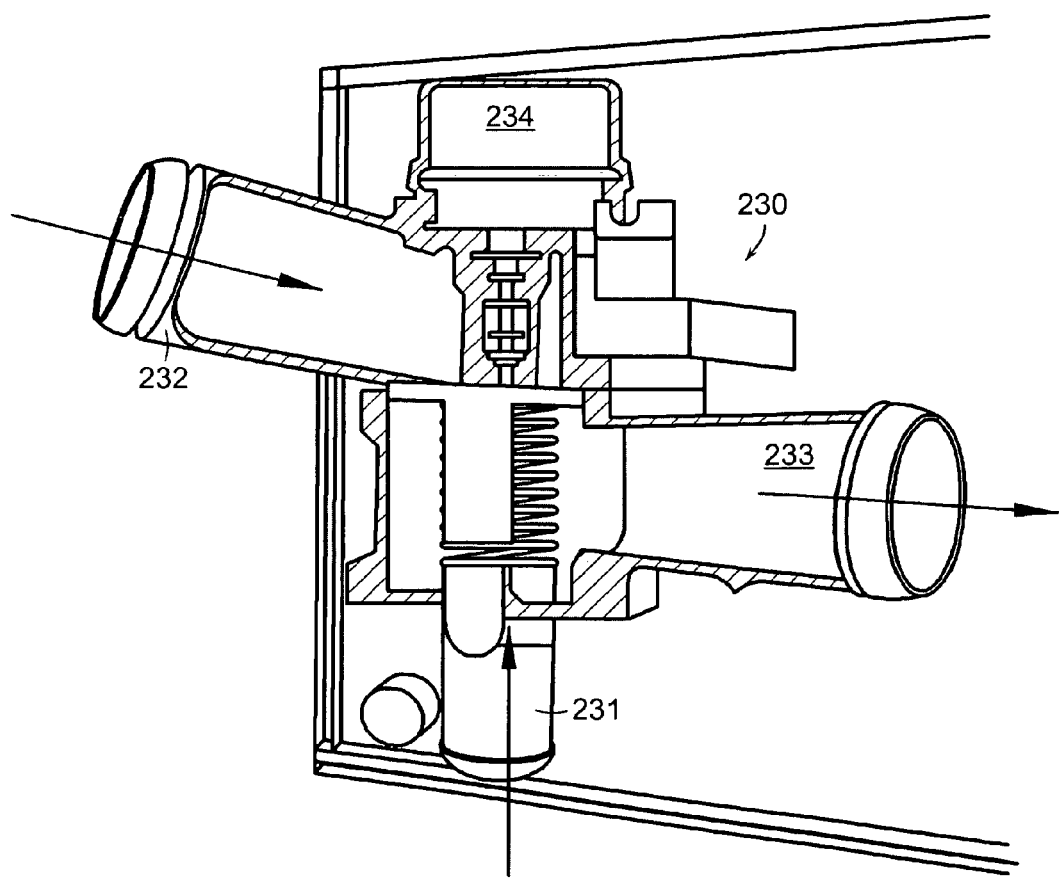
FIG. 3 is a diagram showing a conventional direct-acting temperature control valve.

Reference numerals set forth in the Drawings includes reference to the following elements as further discussed below:

| | |
|---|---|
| 10: | stack |
| 11: | pump |
| 12: | radiator |
| 13, 330: | temperature control valve |
| 331: | motor |
| 332: | operating plunger |
| 333: | first inlet port |
| 334: | second inlet port |
| 335: | exhaust port |
| 336: | plunger operating portion |
| 337: | motor shaft |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 4:
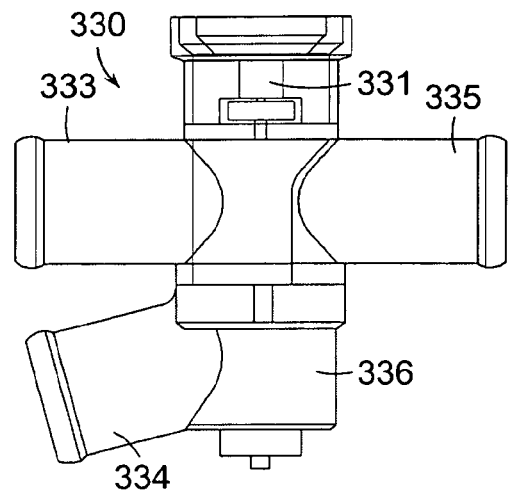
FIG. 4 is a front view showing a coolant temperature controller in accordance with a preferred embodiment of the present invention.
Figure 5:
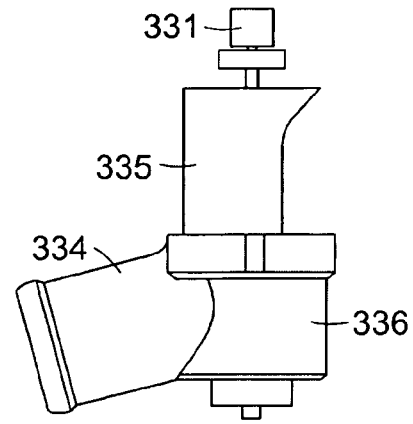
FIG. 5 is a front view showing the coolant temperature controller of FIG. 4 in a state where an upper housing is removed.
Figure 6:
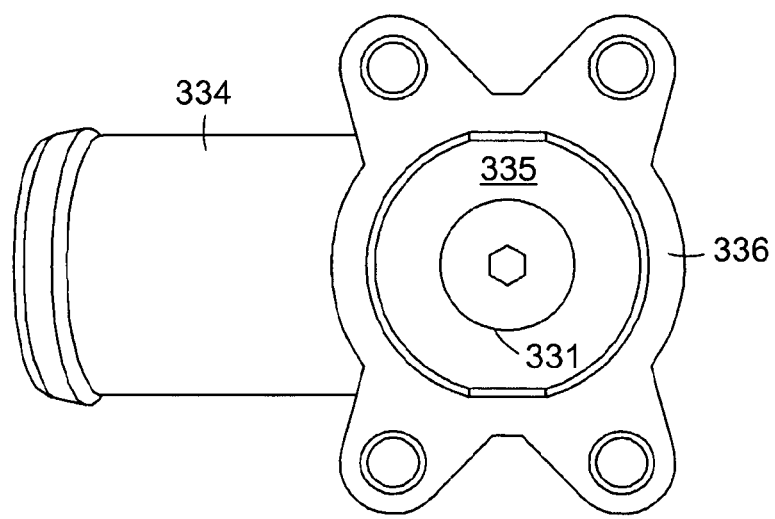
FIG. 6 is a plan view of the coolant temperature controller of FIG. 5.
Figure 7:
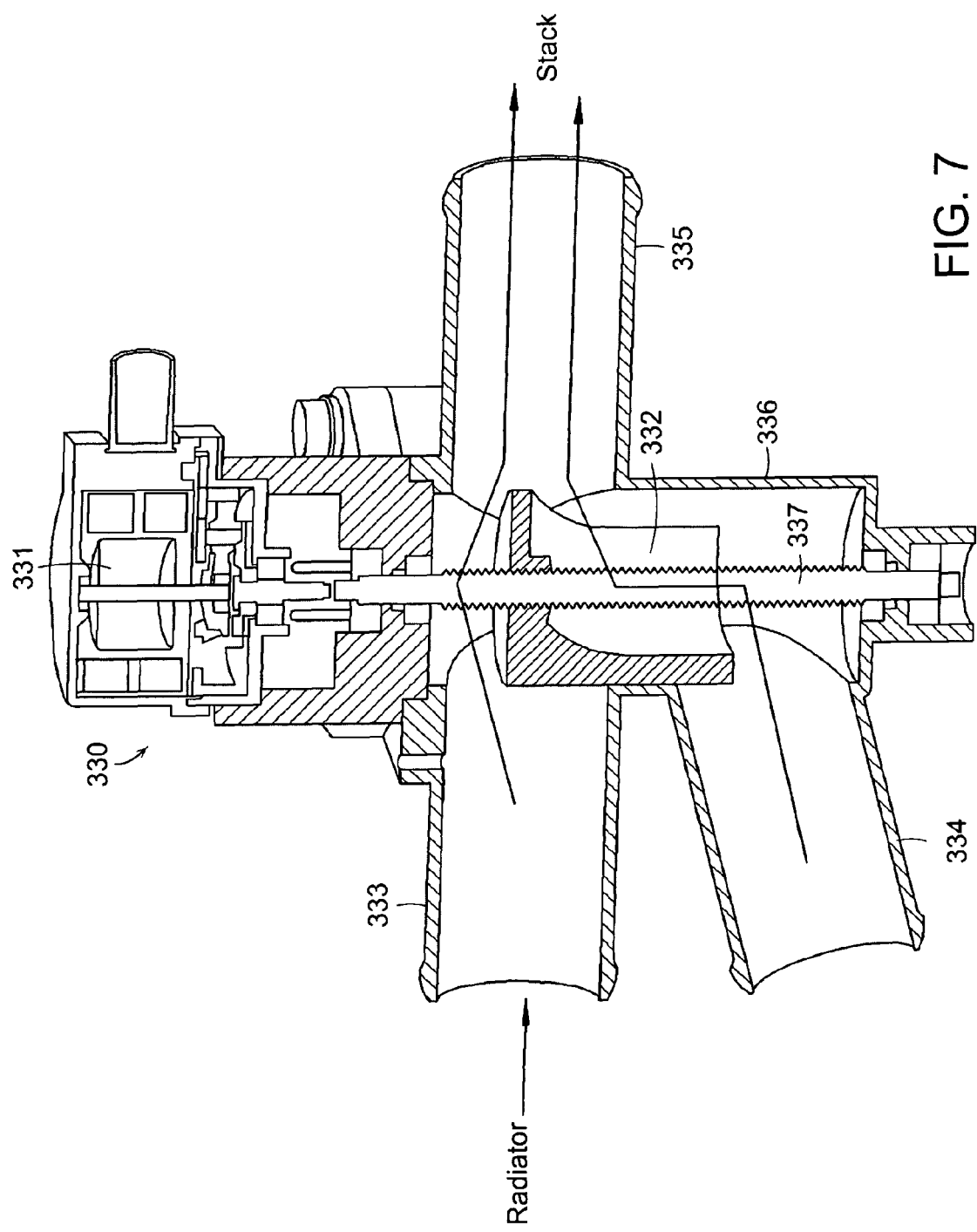
FIG. 7 is a cross-sectional view of the coolant temperature controller of FIG. 4.

FIG. 4 is a front view showing a coolant temperature controller in accordance with a preferred embodiment of the present invention, FIG. 5 is a front view showing the coolant temperature controller of FIG. 4 in a state where an upper housing is removed, FIG. 6 is a plan view of the coolant temperature controller of FIG. 5, and FIG. 7 is a cross-sectional view of the coolant temperature controller of FIG. 4.

In order to accurately and rapidly control the coolant temperature, the present invention provides a structure in which a temperature control valve 330 is mounted at an inlet end of a stack 10 to proportionally control the flow of coolant coming from a by-pass line and coolant from a radiator 12 by moving up and down an operating plunger 332 by the operation of a motor 331 according to the temperature of the coolant introduced into a stack inlet.

That is, the temperature control valve 330 in accordance with the preferred embodiment of the present invention has both an advantage of a rotary type valve capable of proportionally controlling the coolant flow and an advantage of a direct-acting type valve capable of controlling the motor smoothly even under high flow conditions.

The temperature control valve 330 comprises a housing including a first inlet port 333 through which the coolant coming from the radiator 12 is introduced, a second inlet port 334 through which the coolant from a stack outlet is introduced, and an exhaust port 335 through which the coolant is exhausted to the stack inlet.

The first inlet port 333 is provided on the left side of the housing horizontally, the exhaust port 335 is provided in a straight line with the first inlet port 333 on the right side of the housing, and the second inlet port 334 is provided at an inclined angle to be joined with the first inlet port 333.

A plunger operating portion 336 is provided vertically between the first and second inlet ports 333 and 334 and the exhaust port 335 in the middle of the housing. An operating plunger 332 capable of moving up and down is installed in the plunger operating portion 336. The operating plunger 332 screw-connected to a motor shaft 337 does not rotate but moves up and down by the operation of the motor 331 provided on the top of the housing.

That is, as the motor 331 rotates in one direction, the operating plunger 332 screw-connected to the motor shaft 337 does not rotate by the shape of the plunger operating portion 336 formed along that of the operating plunger 332. When the motor shaft 337 rotates in one direction as the operating plunger 332 having a female screw thread is connected to the motor shaft 337 having a male screw thread, the operating plunger 332 moves upward and, when the motor 331 rotates in the other direction, the operating plunger 332 moves downward.

In this case, the plunger operating portion 336 may have an oval shape formed in combination with a circle (curved surface) and a straight line (plane) and, since the operating plunger 332 having the same shape as the plunger operating portion 336 is provided therein, the rotation of the operating plunger 332 is restricted.

Moreover, the operating plunger 332 has a height slightly greater than the inner diameter thereof so as to be able to completely close any one of the first and second inlet ports 333 and 334. The operating plunger 332 has a space in which the coolant flows so as to facilitate the coolant flow from the second inlet port 334 to the exhaust port 335. One side surface of the operating plunger 332 is formed with a vertical curved surface so as to be able to open and close the first and second inlet ports 333 and 334, and the other side surface thereof has an opening so as to be able to discharge the coolant introduced through the second inlet port 334 to the exhaust port 335.

That is, the coolant introduced through the first inlet port 333 directly passes through the top of the operating plunger 332 and flows out to the exhaust port 335, and the coolant introduced through the second inlet port 334 goes by way of the inner space of the operating plunger 332 and then flows out to the exhaust port 335 through the opening.

The operation state of the coolant temperature controller having the above-described configuration will be described below.

First, after measuring the temperature of the coolant in the stack inlet, the coolant temperature controller controls the position of the operating plunger 332 by operating the motor 331 according to the measured temperature so as to proportionally control the coolant introduced through the first and second inlet ports 333 and 334, thus maintaining the coolant at a predetermined temperature.

In more detail, the motor shaft 337 is rotated by the operation of the motor 331 and the operating plunger 332 moves up and down due to the rotation restriction. At this time, if the one side surface of the operating plunger 332 adjacent to the first and second inlet ports 333 and 334 opens the first inlet port 333 and closes the second inlet port 334, the cooled coolant coming from the radiator 12 is supplied to the stack inlet through the exhaust port 335.

Similarly, in the case where the operating surface of the operating plunger 332 overlaps a portion of the first inlet port 333 and a portion of the second inlet port 334, the cooled coolant coming from the radiator 12 and the heated coolant from the stack outlet are supplied to the stack inlet at the same time. In this case, if the first inlet port 333 is more widely opened, much more cooled coolant is introduced, whereas, if the second inlet port 334 is more widely opened, much more heated coolant is introduced.

That is, if the temperature of the coolant introduced into the stack inlet is higher than the predetermined temperature (fore example, 65° C.), the position of the operating plunger 332 is adjusted to increase the opening degree of the first inlet port 333, whereas, if it is lower than the predetermined temperature, the position of the operating plunger 332 is adjusted to increase the opening degree of the second inlet port 334. The position control of the operating plunger 332 is available by controlling the operation of the motor 331.

Next, if the first inlet port 333 is closed and the second inlet port 334 is opened, the heated coolant coming from the stack outlet is supplied to the stack inlet through the exhaust port 335.

Figure 8:
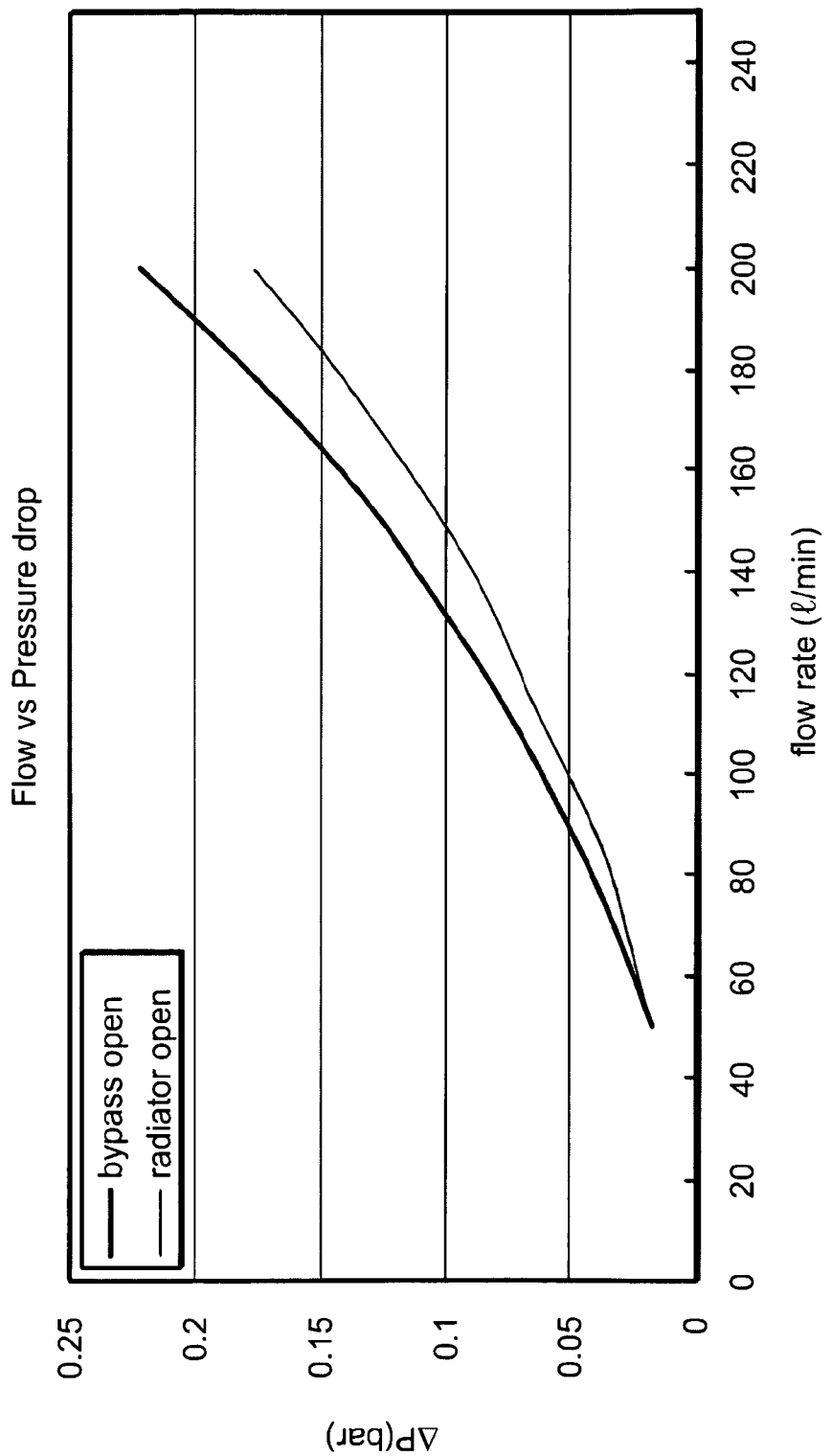
FIG. 8 is a graph showing a pressure drop of the coolant temperature controller of FIG. 4.

FIG. 8 is a graph showing a pressure drop of the coolant temperature controller of FIG. 4. As shown in FIG. 8, since the proportional control of the coolant flow was available, the pressure drop of the system was 5 kPa at 100 LPM. In view of that there was a pressure drop of 20 kPa in the same flow in case of the conventional direct-acting type valve, it could be understood that the pressure drop was improved by the control method in accordance with the present invention.

Figure 9:
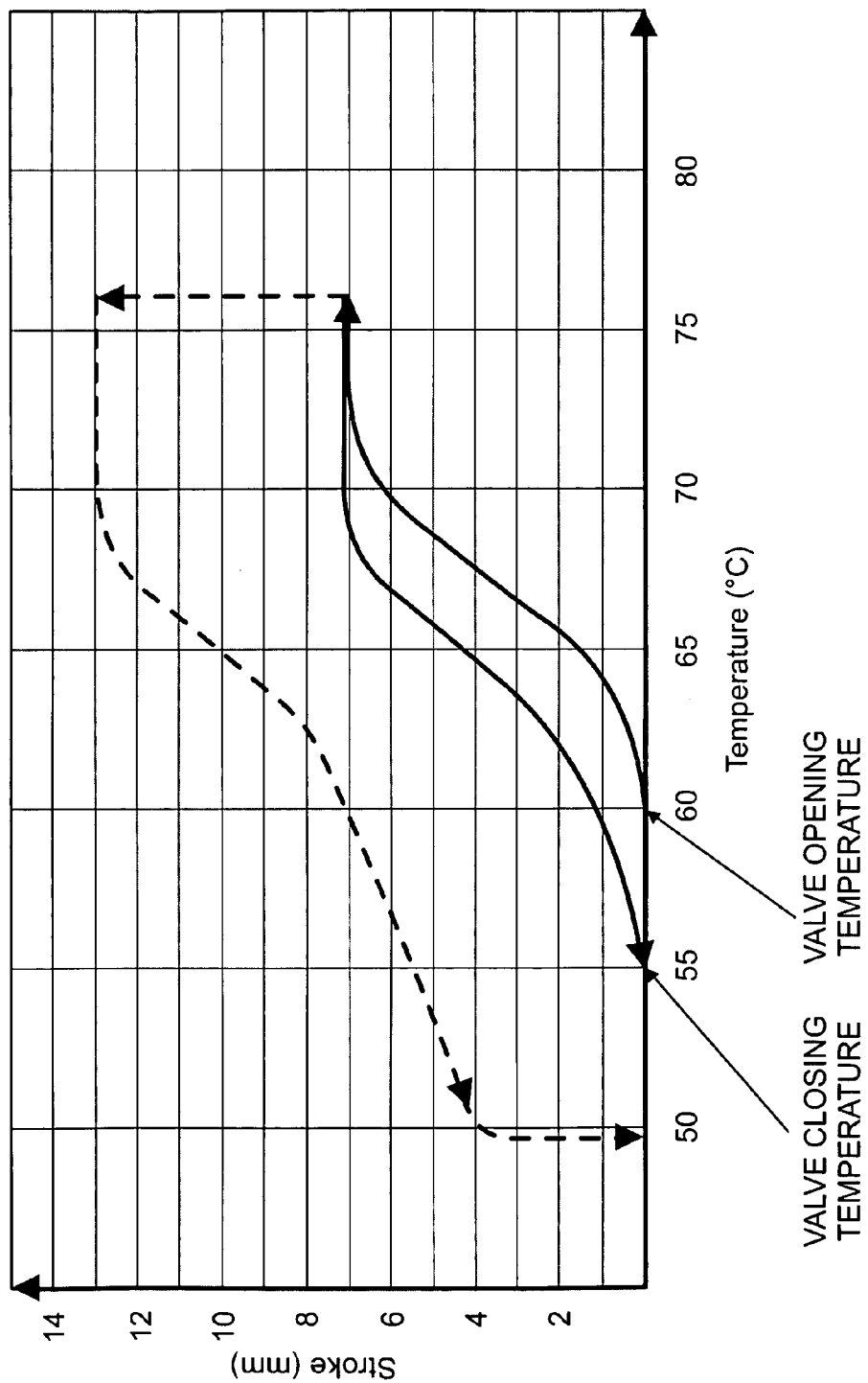
FIG. 9 is a graph showing a thermal hysteresis curve.

FIG. 9 is a graph showing a thermal hysteresis curve. Since the motor is driven according to the temperature signal of the coolant in the stack inlet according to preferred embodiments of the present invention, thermal hysteresis that typically occurs in the conventional direct-acting type valve did not occur, and thus it is possible to accurately and rapidly control the coolant temperature. Accordingly, it is possible to supply the coolant of a predetermined temperature to the stack within several seconds even through the cooling conditions are changed due to external environment.

As described above, according to the coolant temperature controller for a fuel cell vehicle of the present invention, to which the advantages of the conventional direct-acting type valve and rotary type valve are applied, it is possible to control the coolant temperature in real time by driving the motor according to the temperature signal of the coolant in the stack inlet, and thus it is possible to improve the efficiency and performance of the stack output. Moreover, it is possible to supply sufficient coolant even at a low output by reducing the pressure drop to lower the discharge load of the pump.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A coolant temperature controller for a fuel cell vehicle, the coolant temperature controller comprising: a housing including first and second inlet ports provided on one side thereof and an exhaust port provided on the other side thereof in a horizontal direction with respect to the first inlet port; a plunger operating portion including an operating plunger capable of vertical movement between the first and second inlet ports and the exhaust port of the housing to proportionally control degree of opening of the first and second inlet ports; a motor mounted on the top of the plunger operating portion; and a motor shaft connected to the motor and extending from the motor to the bottom of the plunger operating portion to be connected to the operating plunger, wherein the vertical movement of the operating plunger is driven by a rotational force transmitted through the motor shaft as the motor operates, and the operating plunger is vertically provided inside the plunger operating portion and the motor shaft penetrates the center of the operating plunger to be screw-connected thereto.

2. The coolant temperature controller of claim 1, wherein the second inlet port is positioned so as to be inclined with respect to the first inlet port in the plunger operating portion.

3. The coolant temperature controller of claim 2, wherein the first and second inlet ports are positioned in the plunger operating portion such that coolant introduced from a radiator through the first inlet port and coolant introduced from a stack outlet through the second inlet port meet.

4. The coolant temperature controller of claim 3, wherein at lease one of the coolant introduced through the first inlet port and coolant introduced through the second inlet is supplied to a stack inlet through the exhaust port by the vertical movement of the operating plunger.

5. The coolant temperature controller of claim 1, wherein the operating plunger is formed in an oval shape.

* * * * *